Patented Sept. 10, 1946

2,407,566

UNITED STATES PATENT OFFICE 2,407,566

BISDIMETHYLENE THIURAM POLYSULPHIDES

Roger A. Mathes, Akron, and Paul C. Jones, Silver Lake, Ohio, assignors to The B. F. Goodrich Company, New York, N. Y., a corporation of New York No Drawing. Application July 18, 1942, Serial No. 451,496

5 Claims. (Cl. 260—239)

This invention relates to new chemical compounds and pertains specifically to bisdimethylene thiuram polysulphides.

Our new compounds are useful as accelerators for the vulcanization of rubber and also as insecticides or fungicides. They are effective in accelerating the vulcanization of any rubber which can be vulcanized with sulphur, such as caoutchouc, balata, gutta percha, latex, reclaimed rubber, artificial rubber isomers, and copolymers of butadiene with acrylonitrile, styrene, methyl acrylate, methyl methacrylate, isobutylene, and the like.

These new compounds may be represented by the following structural formula

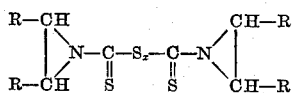

where R is hydrogen or a hydrocarbon group such as methyl, ethyl, phenyl, etc., and $x$ is an integer greater than one.

Our new compounds may be prepared from the salts of the corresponding dimethylene dithiocarbamic acids, the preparation of which is described in our copending application Serial No. 445,516, filed June 2, 1942.

The process of preparing the metal salts consists of reacting an ethylene imine with carbon disulphide in an aqueous medium in the presence of caustic alkali. Since the alkali metal salts of the dimethylene dithiocarbamic acids are quite unstable, it is preferred to carry out the reaction at a temperature below about 35° C. The following example will serve to illustrate the process. To a mixture of 21 parts by weight of sodium hydroxide, 38 parts of carbon disulphide, and 250 parts of water containing a small amount (0.3 part) of a wetting agent such as the hydrochloride of diethylaminoethyloleylamide, there is added slowly and with stirring a solution of 21.5 parts of ethylene imine in 250 parts of water. The temperature of the reaction mixture is kept below 35° C. during the addition of the reagent, which requires about one-half hour. The reaction is complete almost immediately, the product being obtained in the form of an orange colored solution.

The thiuram disulphides may be produced by oxidation of the dimethylene dithiocarbamic acid salts and the tri- and tetrasulphides by treatment of the salts with sulphur dichloride and sulphur monochloride respectively.

Oxidation of the dimethylene dithiocarbamate to the corresponding thiuram disulphide is preferably carried out by treating an aqueous solution of one of the water-soluble salts of the acid, such as an alkali metal salt, with a mild oxidizing agent. Suitable oxidizing agents for this purpose include, among others, sodium nitrite, dilute nitric acid, sodium hypochlorite, ammonium persulphate, and hydrogen peroxide. It is preferred to keep the reaction mixture at a temperature of about 10° to 40° C. during the reaction.

The following specific example will serve to illustrate the method of preparation of our new compounds.

To a solution of 353 parts by weight of sodium dimethylene dithiocarbamate in about 2500 parts of water there was added slowly, with vigorous stirring, a solution of 142 parts of ammonium persulphate in 1500 parts of water. The mixture was cooled during the reaction to maintain the temperature at about 20° to 30° C. A yellow viscous syrup precipitated almost immediately. After standing for a few hours at room temperature, the syrupy product was separated from the reaction mixture, washed with water, and dried. The yield was about 253 parts by weight of bisdimethylene thiuram disulphide.

In making the trisulphide and tetrasulphide it is preferred to add the sulphur dichloride or monochloride in the form of a solution in an inert solvent such as carbon disulphide, carbon tetrachloride, chloroform, benzene, or the like, adding this solution to the water solution of an alkali metal salt of the desired dimethylene dithiocarbamic acid. The conditions for the reaction are otherwise very similar to those described in the oxidation reaction above. Both the tri- and tetrasulphides are solid materials, and are, like the disulphide, effective accelerators for the vulcanization of rubber. The tri- and tetrasulphide, indeed, may be used to replace a portion of the sulphur in the rubber composition because free sulphur is liberated from these compounds during vulcanization.

My new compounds are effective accelerators in amounts ranging from 0.1% to 5% or more of the rubber composition, and may be used in the presence of any of the usual pigments, fillers, reinforcing agents, dyes, softeners, antioxidants, other accelerators, etc., in common use in the rubber and plastics industry.

Although we have herein disclosed specific embodiments of our invention, we do not intend to limit ourselves solely thereto, but only to the extent indicated by the appended claims.

We claim:
1. Compounds having the structural formula

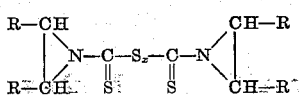

where R is a member of the class consisting of hydrogen and hydrocarbon groups, and $x$ is an integer greater than one.

2. Compounds having the structural formula

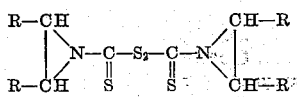

where R is a member of the class consisting of hydrogen and hydrocarbon groups.

3. Compounds having the structural formula

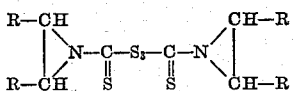

where R is a member of the class consisting of hydrogen and alkyl groups.

4. Compounds having the structural formula

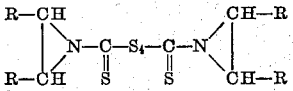

where R is a member of the class consisting of hydrogen and alkyl groups.

5. Bisidimethylene thiuram disulphide.

ROGER A. MATHES.
PAUL C. JONES.